US012767029B2

(12) United States Patent
Kuczynski et al.

(10) Patent No.: US 12,767,029 B2
(45) Date of Patent: Oct. 20, 2026

(54) SNAP-THROUGH COLLAPSIBLE SEAT SIDE BOLSTERS AND FOLDABLE VEHICLE SEAT ASSEMBLIES WITH COLLAPSIBLE SIDE BOLSTERS

(71) Applicant: GM GLOBAL TECHNOLOGY OPERATIONS LLC, Detroit, MI (US)

(72) Inventors: Edward T. Kuczynski, Bloomfield, MI (US); Nilesh D. Mankame, Ann Arbor, MI (US); Matthew Cwynar, Pinckney, MI (US); Wonhee M. Kim, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 126 days.

(21) Appl. No.: 18/765,554

(22) Filed: Jul. 8, 2024

(65) Prior Publication Data

US 2026/0008393 A1 Jan. 8, 2026

(51) Int. Cl.
*B60N 2/90* (2018.01)

(52) U.S. Cl.
CPC .................................... *B60N 2/986* (2018.02)

(58) Field of Classification Search
CPC .......... B60N 2/986; B60N 2/99; B60N 2/914; B60N 2/206
See application file for complete search history.

(56) References Cited

U.S. PATENT DOCUMENTS

| | | | | |
|---|---|---|---|---|
| 3,224,017 A | 12/1965 | Zerbee | | |
| 5,437,498 A | 8/1995 | Waelde | | |
| 5,441,331 A * | 8/1995 | Vento | B60N 2/24 | 297/452.36 |
| 5,975,508 A | 11/1999 | Beard | | |
| 7,086,700 B2 * | 8/2006 | Habedank | B60N 2/206 | 297/378.12 |
| 7,963,553 B2 * | 6/2011 | Huynh | B60R 21/207 | 280/730.2 |
| 9,211,824 B2 * | 12/2015 | Arant | B60N 2/0273 | |
| 9,610,872 B2 * | 4/2017 | Dry | B60N 2/914 | |
| 9,937,836 B2 * | 4/2018 | Dry | B60N 2/206 | |

(Continued)

FOREIGN PATENT DOCUMENTS

| | | |
|---|---|---|
| DE | 102018104584 A1 | 9/2018 |
| DE | 102018108225 A1 | 10/2018 |
| DE | 102020125696 A1 | 5/2021 |

*Primary Examiner* — Joshua J Michener
*Assistant Examiner* — Nevena Aleksic
(74) *Attorney, Agent, or Firm* — Quinn IP Law

(57) ABSTRACT

Presented are seat assemblies with collapsible side bolsters, methods for making/using such seat assemblies, and vehicles equipped with such seat assemblies. A seat assembly includes a seat base, a seat bottom fixed to the seat base, and a seat back pivotably attached to the seat base adjacent the seat bottom. A pair of side bolsters is attached to lateral sides of the seat back or bottom. Each side bolster includes a foam core with a cavity and a bolster trim that covers the foam core. A bolster insert includes a hollow elastic body and is interposed between the bolster trim and foam core. The bolster insert collapses from a deployed state to a retracted state under the weight of the seat back when pivoted against the seat bottom. The bolster insert passively snaps back to the deployed state when the seat back is pivoted away from the seat bottom.

20 Claims, 5 Drawing Sheets

(56) References Cited

U.S. PATENT DOCUMENTS

| | | | | |
|---|---|---|---|---|
| 10,245,987 | B2 | 4/2019 | Castillo | |
| 10,518,683 | B2 * | 12/2019 | Kojima | B60N 2/914 |
| 11,027,635 | B1 * | 6/2021 | Nageshkar | B60N 2/68 |
| 11,614,083 | B2 * | 3/2023 | Kim | F04B 49/00<br>137/224 |
| 11,738,675 | B2 * | 8/2023 | Therry | B60N 2/914<br>297/284.1 |
| 11,858,387 | B2 | 1/2024 | Reader | |
| 12,114,786 | B2 | 10/2024 | Dufresne | |
| 2009/0272871 | A1 | 11/2009 | Haller | |
| 2010/0052356 | A1 | 3/2010 | Lewis, II | |
| 2010/0133413 | A1 | 6/2010 | Wahls | |
| 2010/0231016 | A1 | 9/2010 | Volz | |
| 2013/0119695 | A1 | 5/2013 | Rosenplaenter | |
| 2015/0231992 | A1 | 8/2015 | Gundall | |
| 2018/0290570 | A1 * | 10/2018 | Raines | B60N 2/99 |

* cited by examiner

SNAP-THROUGH COLLAPSIBLE SEAT SIDE BOLSTERS AND FOLDABLE VEHICLE SEAT ASSEMBLIES WITH COLLAPSIBLE SIDE BOLSTERS

INTRODUCTION

The present disclosure relates generally to seat assemblies with side bolsters. More specifically, aspects of this disclosure relate to seat-back and seat-bottom side bolsters for foldable occupant seat assemblies of motor vehicles.

Current production motor vehicles, such as the modern-day automobile, are originally equipped with driver-side, passenger-side, and—depending on vehicle body layout—rear seat assemblies for comfortably seating the occupants of the vehicle. A vehicle seat assembly may be composed of an internal skeletal seat frame that is mounted to a vehicle floor panel, for example, via a fore-aft slide rail assembly. Foam cushions overlay and attach to complementary wire suspension segments of the framework to separate the occupant from the rigid seat frame. Flexible cushion covers, such as fabric, leather, or vinyl seat trim, conceal any readily visible segments of the frame and the foam cushions to form the occupiable exterior surfaces of the seat. Driver-side and passenger-side front seat assemblies can be typified by an upper, generally vertical backrest portion that is tiltable relative to a lower, generally horizontal seat portion. Many vehicle seat assemblies, particularly single-passenger bucket and captain style seats, are fabricated with side bolsters along the inboard and outboard flanks of the seat cushion and seat back to provide improved lateral support and a "snug fit" for the seat occupant.

SUMMARY

Presented below are collapsible side bolsters for seat assemblies, methods for manufacturing and methods for operating such seat assemblies, and motor vehicles equipped with foldable rear occupant seats with passively collapsible side bolsters. By way of example, and not limitation, there are disclosed seat bolster designs that use a "snap-through" element that is structurally configured to reversibly toggle between a deployed state and a retracted state. When deployed, each side bolster projects at an increased height from the seat back/cushion to provide lateral support to the seat occupant. Conversely, when compressed into the retracted state, each side bolster collapses to a decreased height, e.g., to facilitate compact folding of the seat assembly. The bolster may be formed with an elastomeric, polymeric, or metallic insert that readily collapses ("snaps through") when the seat back/bottom is folded. In monostable and pseudo-bistable configurations, the bolster insert automatically reverts back ("snaps back") to its original shape upon removal of the applied load due to unfolding of the seat back/bottom. In a bistable use-case, the bolster insert remains in the deformed/collapsed state achieved by folding the seat back/bottom; however, the bolster insert reverts back to its original shape upon application of an external force (e.g., a person tugging on finger loops attached to the member for this purpose). The foregoing design may enable the occupant seat assembly to simultaneously provide improved lateral support during regular vehicle operation and reduced bolster height for folding the seat when not in use. While not per se limited, the collapsible seat side bolster may be particularly applicable to second and third-row vehicle seats that are foldable to provide flexibility in seating configuration. Disclosed seat side bolster designs may be driven by a trade-off between comfort during normal operation and the need to fold the seat into a compact configuration when not in use.

A key element of at least some of the collapsible bolster designs is an elastic member whose force-displacement behavior exhibits limit point traversal without undergoing irreversible deformations. When this member is loaded by an external force, it initially exhibits a positive stiffness response. However, when a critical threshold force level is exceeded, the member exhibits a negative stiffness for some part of its response. The behavior of this member may be categorized as: (a) mono-stable, when the member quickly reverts back to its original configuration by itself after the deforming force is removed, (b) bistable, when the member can persist indefinitely in the configuration that it achieves after traversing the negative stiffness region until another external load acts to reverse its deformation, or (c) pseudo-bistable, when the member reverts back to its original configuration by itself but it takes a comparatively long time to recover its original configuration after removal of the load. In all of the foregoing cases, the elastic member is designed such that no part of it experiences failure (e.g. plastic deformation, fracture, etc.) during the loading or unloading of the member during its intended use.

Aspects of this disclosure are directed to seat assemblies with collapsible side bolsters. In an example, a seat assembly (e.g., bucket-style vehicle occupant seat) is presented for seating a user (e.g., vehicle occupant) on a floor structure (e.g., a vehicle floor panel). The seat assembly includes a seat base that abuts the floor structure, a seat bottom that is attached to the seat base and seats thereon the user, and a seat back that is pivotably attached to the seat base adjacent the seat bottom. A pair of (first and second) side bolsters is attached to lateral (first and second) sides of the seat bottom or seat back. Each side bolster includes a foam core with a cavity, a bolster trim that covers the foam core, and a bolster insert that is interposed between the bolster trim and the foam core. The bolster insert includes a hollow elastic body with predefined geometric and material characteristics that enable the insert to: (1) collapse from an outwardly projecting deployed state to an inwardly collapsed retracted state under the compressive force exerted on the insert when the seat back is pivoted against the seat bottom, and (2) snap back from the retracted state to the deployed state upon pivoting of the seat back away from the seat bottom, e.g., when the body is designed to exhibit a monostable (or pseudo-bistable) limit point response. It is envisioned that disclosed seat side bolster features may be employed for both vehicular and non-vehicular applications alike.

Additional aspects of this disclosure are directed to motor vehicles containing foldable occupant seats with collapsible side bolsters. As used herein, the terms "vehicle" and "motor vehicle" may be used interchangeably and synonymously to include any relevant vehicle platform, such as passenger vehicles, commercial vehicles, industrial vehicles, off-road and all-terrain vehicles (ATV), motorcycles, farm equipment, watercraft, aircraft, spacecraft, etc. For non-automotive applications, disclosed seat bolster concepts may be implemented for any logically relevant use, including office chairs, gaming chairs, infant seats, etc. In an example, a motor vehicle includes a vehicle body with a passenger compartment, multiple road wheels mounted to the vehicle body (e.g., via corner modules coupled to a unibody or body-on-frame chassis), and other standard original equipment. A prime mover, which may be in the nature of a traction motor and/or internal combustion engine assembly, is located inside the vehicle body and drives at least one of the road wheel(s) to propel the vehicle. One or more vehicle seat assemblies are disposed inside the passenger compartment, securely mounted onto a rigid, subjacent vehicle floor plate.

Continuing with the discussion of the foregoing example, each vehicle seat assembly includes a seat base that is mounted onto the vehicle floor plate, a seat bottom that is slidably/tiltably mounted to the seat base, and a seat back that is pivotably mounted to the seat base adjacent the seat bottom to transition between upright and folded seat back positions. A pair of side bolsters adjoins inboard and outboard sides of the seat bottom or seat back. Each of the side bolsters includes a foam core with a cavity, a bolster trim that covers the foam core, and a padded topper layer that is located between the bolster trim and foam core. A bolster insert is covered by the bolster trim and sandwiched between the padded topper layer and foam core. The bolster insert includes a hollow elastic body that is structurally configured to: (1) automatically collapse from an outwardly projecting deployed state to an inwardly collapsed retracted state under the compressive force (weight) of the seat back when the seat back is folded down against the seat bottom, and (2) snap back from the retracted state to the deployed state when the seat back is lifted up off of the seat bottom.

Further aspects of this disclosure are directed to manufacturing systems, workflow processes, and control logic for making or for using any of the herein described collapsible side bolsters, seat assemblies, and/or motor vehicles. In an example, a method is presented for assembling a seat assembly for seating a user on a floor structure. This representative method includes, in any order and in any combination with any of the above and below disclosed options and features: receiving a seat base configured to abut and/or mount to the floor structure; attaching a seat bottom to the seat base, the seat bottom being configured to seat thereon the user; attaching a seat back to the seat base adjacent the seat bottom, the seat back being configured to pivot between a folded position and an upright position; and attaching first and second side bolsters to first and second sides, respectively, of the seat bottom or the seat back, the first and second side bolsters each including: a foam core defining a cavity; a bolster trim covering the foam core; and a bolster insert interposed between the bolster trim and the foam core, the bolster insert including a hollow elastic body configured to collapse from a deployed state to a retracted state under a compressive force when the seat back is pivoted against the seat bottom, and to snap back from the retracted state to the deployed state. The insert body may passively snap back when the bolster insert exhibits a monostable (or pseudo-bistable) limit point response; the bolster insert body may be actively reverted back to its original state by the application of an external force when the bolster insert exhibits a bistable limit point response.

For any of the disclosed seats, vehicles, and methods, each side bolster may include a padded topper layer that is interposed between the bolster trim and the bolster insert. In this example, the bolster trim may abut and lay flush against an outward-facing surface of the padded topper layer, and the bolster insert may abut and lay flush against an inward-facing surface of the padded topper layer. As another option, the internal bolster cavity may be interposed between the foam core and the bolster insert such that a center portion of the bolster insert's hollow elastic body collapses into the cavity when in the retracted state. Alternatively, the foam core may abut and lay flush against the bolster insert; in this case, the internal bolster cavity is defined within the foam core.

For any of the disclosed seats, vehicles, and methods, the bolster insert's hollow elastic body may have an arcuate shape with a semi-elliptical cross-section when in the deployed state, and may have a waveform cross-section with interleaved peaks and valleys when in the retracted state, as non-limiting examples. As another non-limiting option, the bolster insert's hollow elastic body may have a deployed (first) center height when in the deployed state and a retracted (second) center height when in the retracted state. In at least some applications, the bolster insert's increased center height is at least 1.5 to 2-times larger than its decreased center height. For at least some applications, the internal bolster cavity may be filled with an ultra-low density, high-resiliency foam filler (e.g., reticulated polyurethane foam).

For any of the disclosed seats, vehicles, and methods, the bolster insert's hollow elastic body may be pseudo-bistable and may be formed, in whole or in part, from a compliant viscoelastic polymer, such as a silicon rubber compound, thermoplastic polyurethane (TPPU), or ethylene propylene diene monomer (EPDM) rubber, as some non-limiting examples. It may be desirable that the lateral width of the bolster insert's hollow polymeric body be larger than its vertical height. It may also be desirable that the bolster insert's hollow polymeric body have a uniform thickness, e.g., of about 3 millimeters (mm) to about 5 mm. As another non-limiting option, the bolster insert's hollow body may be a pseudo-bistable, polymeric construction that has a semi-ellipsoidal dome shape with an open elliptical base. As yet a further non-limiting option, the bolster insert body may have an open base that is rigidly anchored to an internal frame structure of the seat bottom or the seat back.

For any of the disclosed seats, vehicles, and methods, each side bolster may include a fluid bladder that is disposed inside the internal bolster cavity and is operatively attached to the seat bottom or seat back such that: (1) pivoting the seat back against the seat bottom causes fluid to evacuate from the fluid bladder, e.g., causing the bladder to pull the bolster insert to the retracted state, and (2) pivoting the seat back away from the seat bottom causes fluid to fill the fluid bladder, e.g., such that the bladder expands and biases the bolster insert to the deployed state. In this instance, each side bolster may also include a pneumatic cylinder that is fluidly coupled to the fluid bladder, a piston reciprocally slidable within the pneumatic cylinder, and an articulating mechanical linkage connecting the piston to the seat bottom or seat back. With this arrangement, pivoting the seat back against the seat bottom causes the mechanical linkage to pull the piston to an evacuate (first) position creating a vacuum pressure that evacuates fluid from the fluid bladder. Pivoting the seat back away from the seat bottom causes the mechanical linkage to push the piston to a fill (second) position creating a fluid pressure that pushes fluid into the fluid bladder. A tether, mechanical connector, or adhesive may physically couple the fluid bladder to the bolster insert. As yet a further option, a return spring may be disposed inside the pneumatic cylinder to bias the piston towards the fill position.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
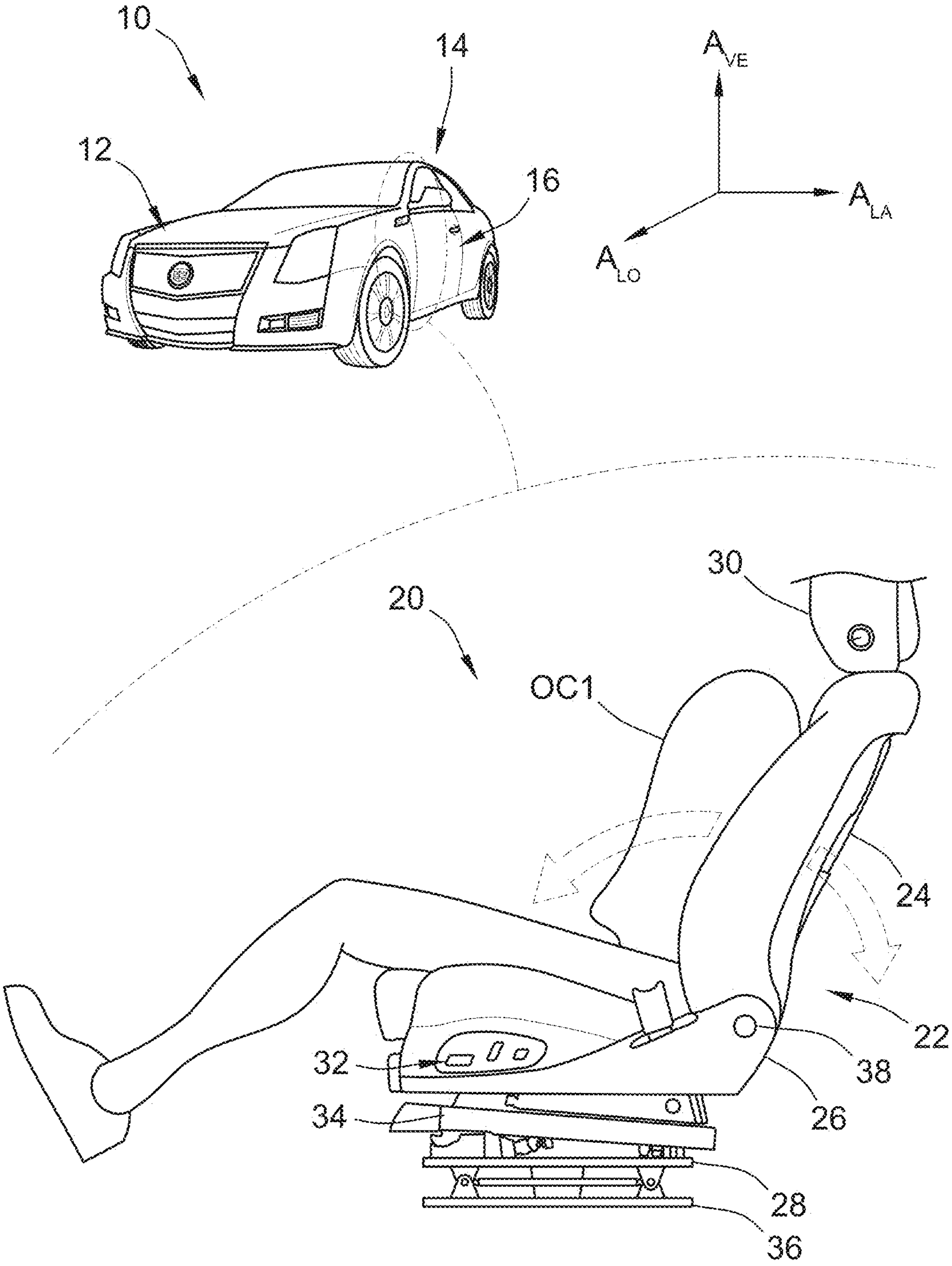
FIG. 1 is a front perspective-view illustration of a representative motor vehicle with an inset, side-view illustration of a representative vehicle occupant seat with passible collapsible side bolsters in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a two-door, coupe-style automobile. The illustrated automobile 10—also referred to herein as "motor vehicle" or "vehicle" for short—is merely an exemplary application with which aspects of this disclosure may be practiced. In the same vein, incorporation of the present concepts into the illustrated vehicle occupant seat should be appreciated as a non-limiting implementation of disclosed features. As such, it will be understood that aspects and options of this disclosure may be utilized for other vehicle seat architectures, may be incorporated into any logically relevant type of vehicle, and may be utilized for both automotive and non-automotive applications alike. Moreover, only select components of the motor vehicle and seat assembly are shown and described in detail herein. Nevertheless, the vehicles and seats discussed below may include numerous additional and alternative features, and other available peripheral hardware, for carrying out the various methods and functions of this disclosure.

Mounted inside a vehicle body 16 of the automobile 10 of FIG. 1, within a passenger compartment 14 located aft of an engine compartment 12, is a vehicle seat assembly 20 for seating thereon an occupant OC1. To provide comfortable, yet functional support for the occupant OC1 of the automobile 10, the seat assembly 20 is provided with a bucket-style occupant chair 22 that is contoured, for example, to securely retain riders in place during velocity changes and maneuvering operations. The occupant chair 22 may be typified by three interconnected subassemblies: a generally vertical seat back subassembly 24 (also referred to herein as "seat back" or "backrest"), a generally horizontal seat bottom subassembly 26 (also referred to as "seat bottom" or "bottom rest"), and a seat base subassembly 28 (also referred to herein as "seat platform"). To provide reclinable and foldable functionalities, the seat back subassembly 24 may be pivotably attached to the seat bottom subassembly 26, both of which receive subjacent support on the seat base subassembly 28. Both the seat back and seat bottom subassemblies 24, 26 may incorporate components and features typical to vehicle seat backs and seat bottoms, such as cushions of various designs, materials, and durometer ratings (e.g., Shore A or OO), as well as any requisite internal frame structures, armrests, seat belt straps and anchors, etc. For example, an optional repositionable headrest 30 may project upwards from a top-most terminal end of the seat back subassembly 24.

Vehicle seat assembly 20 of FIG. 1 may have a "power seat" configuration in which the heights, angles, and/or fore-aft positions of the seat back subassembly 24 and seat bottom subassembly 26 may be individually and/or collectively adjustable, e.g., through operation of a motorized seat adjustment system 32. By way of non-limiting example, the occupant chair 22 may be moved to a desired fore-aft position relative to the vehicle 10 by laterally spaced glide rails 34. The glide rails 34 may be integrated into the seat base subassembly 28, which is securely mounted onto a subjacent floor structure, such as vehicle floor panel 36. A set of articulating seatback hinges 38 pivotably mount the seat back subassembly 24 to the seat base subassembly 28 adjacent a rearward end of the seat bottom subassembly 26. The articulating seatback hinges 38 allow the seat back 24 to be selectively folded or pitched forward onto the seat bottom 26 and selectively erected or reclined backward away from the seat bottom 26.

Figure 2A:
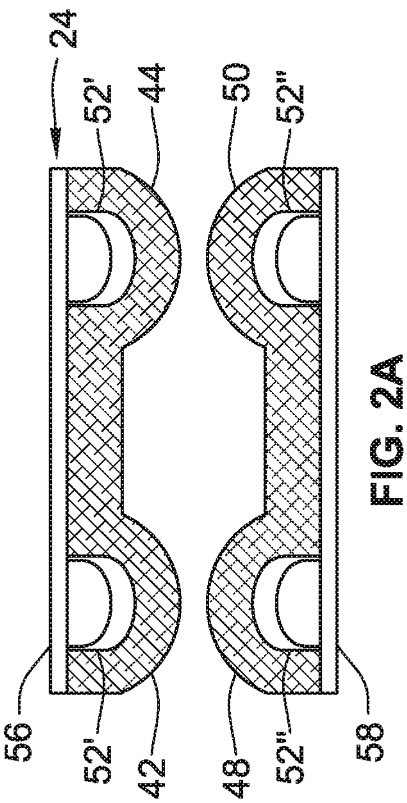
FIGS. 2A and 2B are sectional illustrations of the seat-back and seat-bottom portions of the representative vehicle seat assembly of FIG. 1 showing the collapsible side bolsters in a deployed state (FIG. 2A) and a retracted state (FIG. 2B).
Figure 2B:
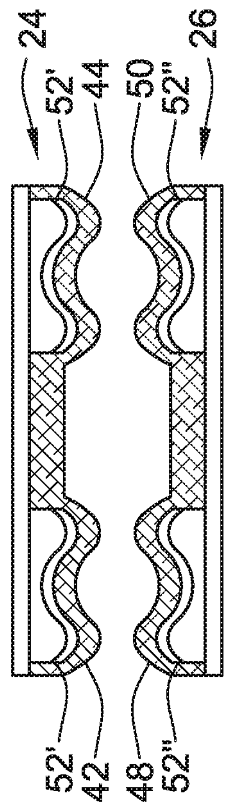
Figure 2:
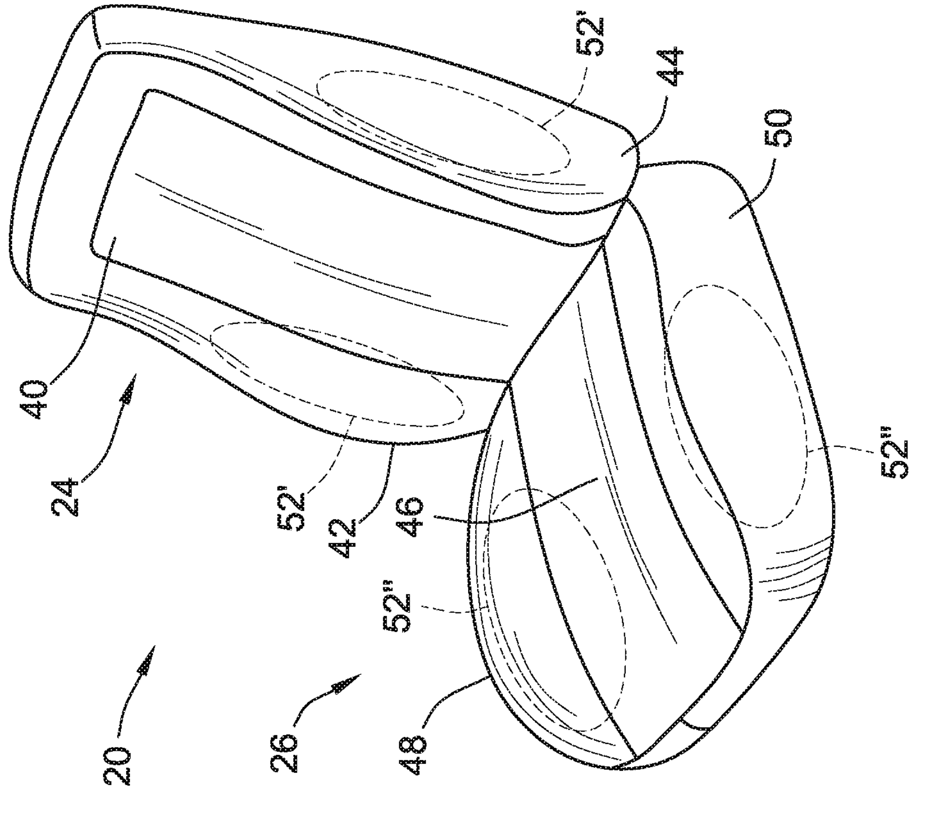
FIG. 2 is a front perspective-view illustration of the seat-back and seat-bottom portions of the representative vehicle occupant seat of FIG. 1.

FIG. 2 illustrates the seat back and seat bottom subassemblies 24, 26 of FIG. 1 with the seat back 24 in an upright and partially reclined position. The occupant chair 22 is equipped with one or more collapsible side bolsters that collectively provide the occupant OC1 of the seat assembly 20 with improved lateral support and comfort, e.g., during routine vehicle operation, while also providing a decreased seat profile when folding the seat assembly 20, e.g., to facilitate access to surrounding portions of the vehicle compartment 14. According to the illustrated example, the seat back subassembly 24 generally includes a central backrest cushion 40 that is flanked on inboard and outboard sides thereof by a pair of (first and second) collapsible backrest side bolsters 42 and 44. In the same vein, the seat bottom subassembly 26 generally includes a central base cushion 46 that is flanked on inboard and outboard sides thereof by a pair of (first and second) collapsible base side bolsters 48 and 50. Alternative seat applications may include greater or fewer than the four seat side bolsters 42, 44, 48, 50 illustrated in FIG. 2.

Figure 6:
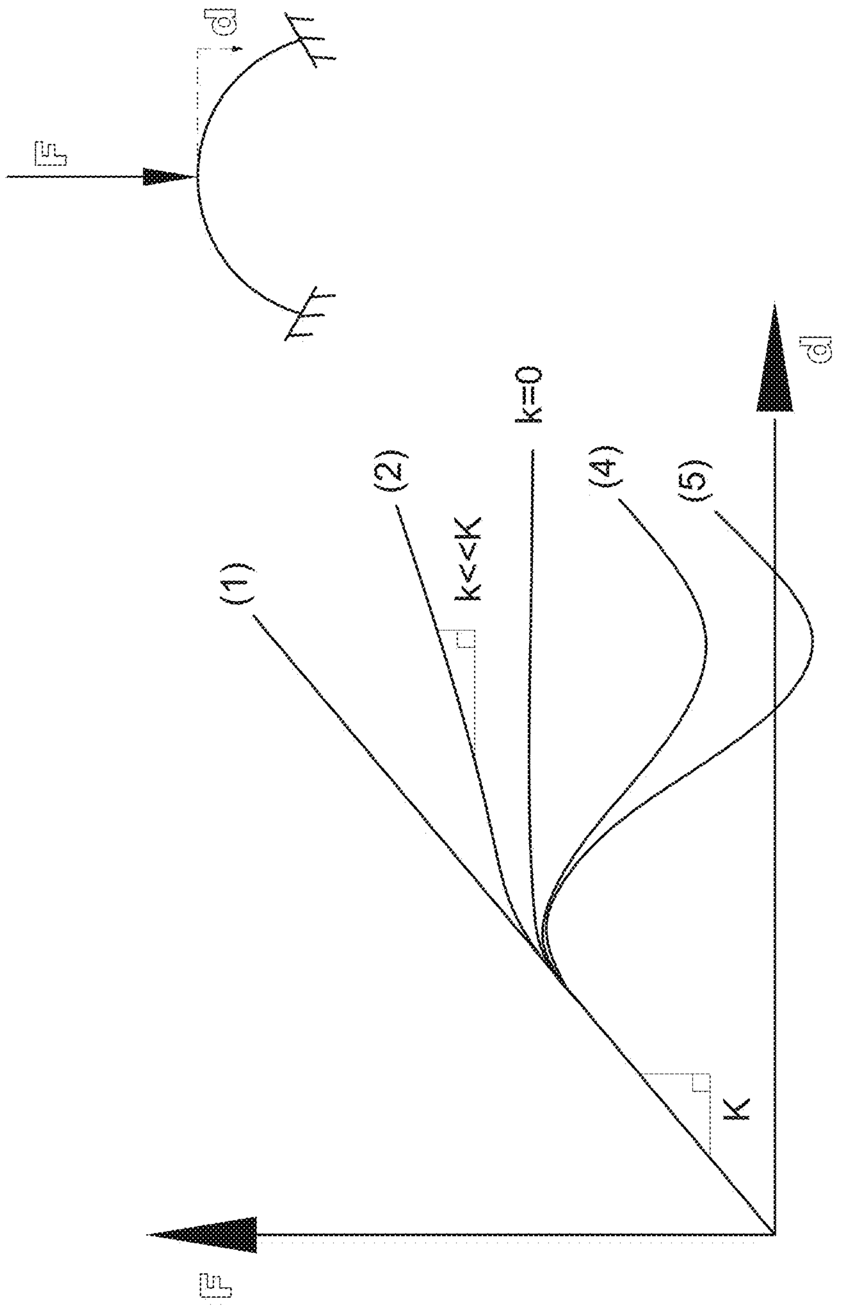
FIG. 6 is a representative force-displacement graph illustrating examples of monostable bolster insert response (4) and bistable bolster insert response (5) as a function of force (F) and displacement (d) when compared to simple-linear, positive stiffness (1), non-linear, positive stiffness (2), and non-linear, zero stiffness responses.

Collapsing ("stowing") and expanding ("deploying") bolster functionality may be provided by elastic "snap through" devices 52' and 52" that are packaged inside the seat side bolsters 42, 44, 48, 50, e.g., and exhibit limit point traversals without undergoing irreversible deformations. FIG. 6 graphically illustrates Curve 4 (monostable) and Curve 5 (bistable) to denote non-limiting examples of mechanical responses (force vs. displacement) that are exhibited by bolster inserts disclosed herein. FIG. 2A, for example, portrays the seat back 24 and seat bottom 26 subassemblies when the seat back 24 is in an upright position and the collapsible side bolsters 42, 44, 48, 50 are in a raised-height deployed state with the elastic devices 52' and 52" fully expanded. Conversely, FIG. 2B portrays the seat back 24 and seat bottom 26 subassemblies when the seat back 24 is in a folded position and the collapsible side bolsters 42, 44, 48, 50 are in a decreased-height retracted state with the elastic devices 52' and 52" partially collapsed. It is envisioned that the vehicle seat's side bolsters 42, 44, 46, 48 and their internally packaged the elastic devices 52' and 52" may each be integrated into their respective subassembly 24, 26 as part of a unitary structure (as shown). Alternatively, one or more of the side bolsters 42, 44, 48, 50 may be individually fabricated as separate components that are subsequently mounted onto the occupant chair 22 in their respective positions.

Figure 3A:
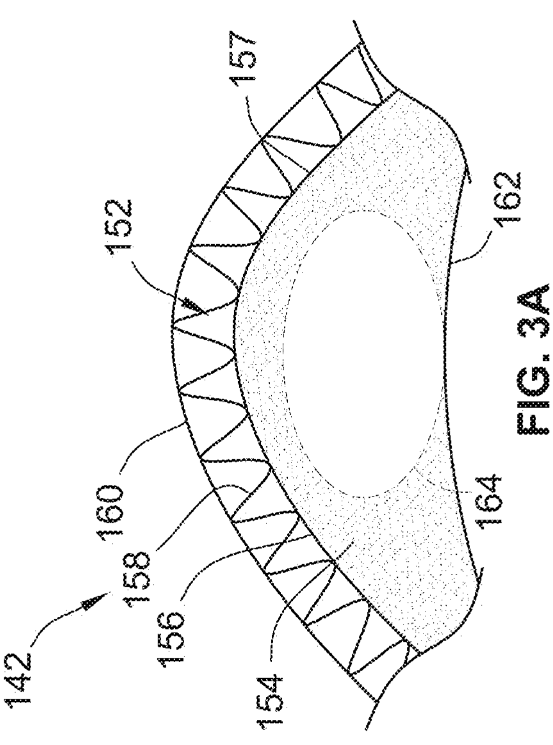
FIGS. 3A and 3B are sectional illustrations of a representative snap-through collapsible seat bolster in a deployed state (FIG. 3A) and a retracted state (FIG. 3B) in accord with aspects of the present disclosure.
Figure 3B:
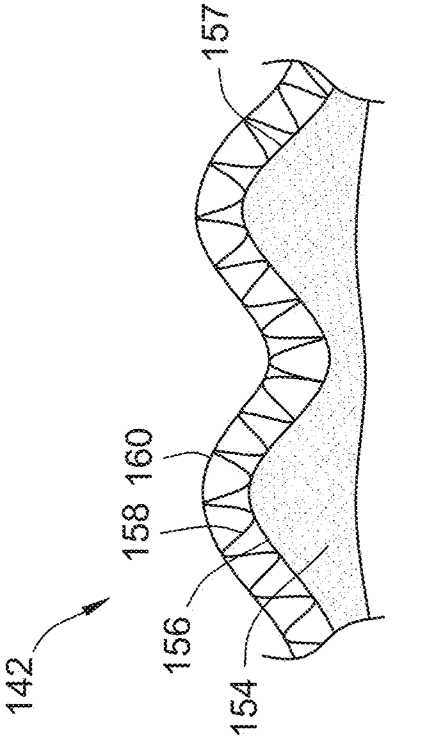

Turning next to FIGS. 3A and 3B, there is shown a non-limiting example of a collapsible seat bolster 142 with an internal pseudo-bistable "snap through" device 152 that is structurally configured to passively and reversibly toggle between a deployed state (FIG. 3A) and a retracted state (FIG. 3B). While differing in appearance, the collapsible seat bolster 142 and pseudo-bistable device 152 of FIGS. 3A and 3B may be representative of any one of the seat side bolsters 42, 44, 48, 50 and elastic devices 52' and 52" of FIG. 2. By way of non-limiting example, the collapsible seat bolster 142 is shown in FIG. 3A as a quadripartite subassembly composed of an innermost foam core 154, a viscoelastic "snap through" and "snap back" bolster insert 156 adjacent the foam core 154, a compressible padded topper layer 158 adjacent the bolster insert 156, and an exterior "class A surface" bolster trim 160 covering the core 154, insert 156, and topper 158. In accord with the illustrated example, the padded topper layer 158 is sandwiched between the bolster trim 160 and bolster insert 156, and the bolster insert 156 is sandwiched between the padded topper layer 158 and the foam core 154. With this arrangement, the bolster trim 160 physically abuts and lays flush against an outward-facing surface of the padded topper layer 158, the bolster insert 156 physically abuts and lays flush against an inward-facing surface of the padded topper layer 158, and the foam core 154 physically abuts and lays flush against an inward-facing surface of the bolster insert 156. While described herein as a passively activated, pseudo-bistable structure, the seat bolster's elastic snap through device 152 may be reconfigured for active actuation and for monostable and bistable use.

To provide an aesthetically pleasing yet durable occupant contact surface, the bolster trim 160 may be formed from any suitable seat cover material, including natural and synthetic leathers (vinyl), natural and synthetic fabrics (polyester), and natural and synthetic rubbers (neoprene). For increased occupant comfort, the padded topper layer 158 may exhibit a low storage modulus and, thus, may be formed from a high-resilience polyurethane foam. The topper 158 may also comprise a three-dimensional knit material or an open-celled foam (e.g., based on a polyol) that offers low resistance to air circulation and thus improves the thermal comfort of the occupant. The foam core 154, in contrast, may be formed from any suitable seat cushion material, including high-density and medium-density polymeric foams, such as high-density polyurethane (HDPU) foam or cross-linked medium-density polyethylene (MDPE) foam. In FIG. 3A, the foam core 154, e.g., together with the underlying structural seat element (e.g., a reaction pad supported by a seat suspension), defines therein an internal bolster cavity 162 that is partially or fully consumed by the core foam 154 when 156 is in its collapsed/stowed configuration. For at least some applications, the cavity 162 may be partially or completely filled with an ultra-low density flexible foam filler 164, such as a reticulated polyurethane foam.

Figure 4A:
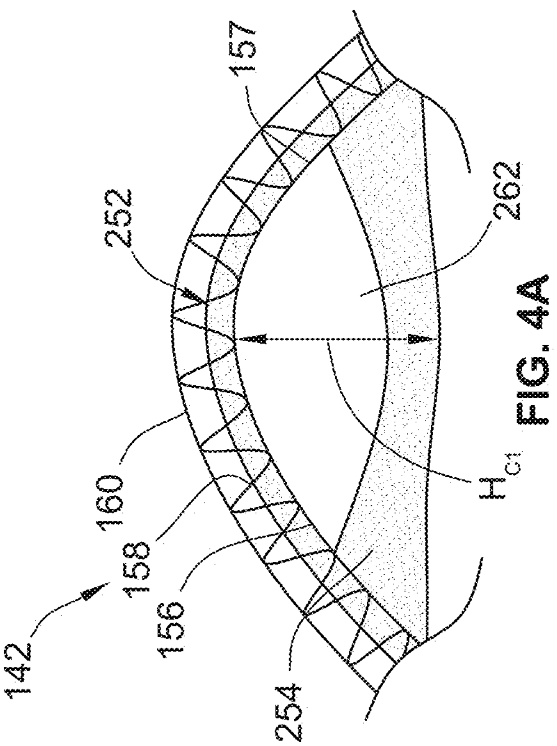
FIGS. 4A and 4B are sectional illustrations of another representative snap-through collapsible seat bolster in a deployed state (FIG. 4A) and a retracted state (FIG. 4B) in accord with aspects of the present disclosure.
Figure 4B:
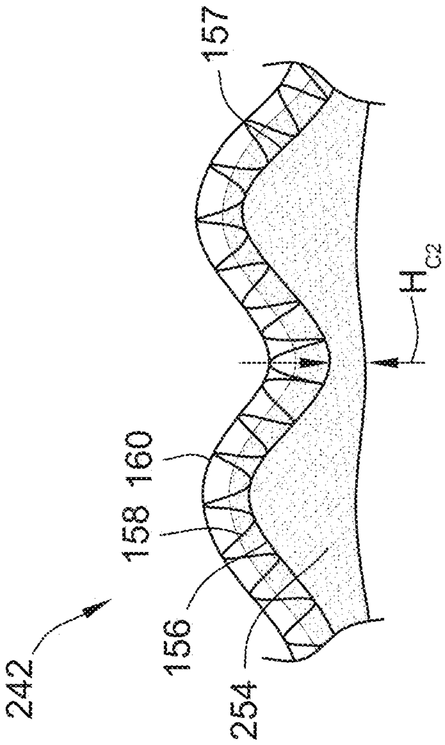

FIGS. 4A and 4B present another non-limiting example of a collapsible seat bolster 242 with an internal pseudo-bistable "snap through" device 252 that is structurally configured to passively and reversibly toggle between a deployed state (FIG. 4A) and a retracted state (FIG. 4B). Similar to the configurations presented in FIGS. 3A and 3B, the collapsible seat bolster 242 and pseudo-bistable device 252 of FIGS. 4A and 4B may be representative of any one of the seat side bolsters 42, 44, 48, 50 and elastic devices 52' and 52" of FIG. 2. As a non-limiting point of similarity with the collapsible seat bolster 142 of FIGS. 3A and 3B, the collapsible seat bolster 242 is shown in FIG. 4A as a quadripartite subassembly composed of an innermost foam core 254, the bolster insert 156 adjacent the foam core 254, the padded topper layer 158 adjacent the bolster insert 156, and the bolster trim 160 covering the core 254, insert 156, and topper 258. In contrast to the collapsible seat bolster 142, the foam core 254 of FIG. 4A physically abuts but does not lay flush against the inward-facing surface of the bolster insert 156. This is so because the internal bolster cavity 262 of FIG. 4A is interposed between the foam core 254 and the bolster insert 156 such that a center portion of the insert 156 may collapse into and partially or completely fill the cavity 262. While described herein as a passively activated, pseudo-bistable structure, the seat bolster's elastic snap through device 252 may be reconfigured for active actuation and for mono-stable and bistable use.

The bolster insert 156 of FIGS. 3A, 3B, 4A and 4B may be designed such that the insert 156 elastically collapses when folding the seat back/bottom and elastically recovers back to its original shape upon removal of the applied load when the seat back/bottom is unfolded. Unlike some conventional seat bolster constructions, in which a rigid bolster insert is integrated into the seat assembly to prevent bolster sagging, disclosed concepts employ an elastically morphing monostable (pronounced mono-stay-bull) structure that is designed to collapse under a compressive load and revert back to its original configuration upon removal of the load without hydraulic, pneumatic, or electronic impetus. By cooperatively engineering both the geometric parameters and the material characteristics of the monostable bolster insert 156, the bolster insert 156 structure may be compressed into a stowed/collapsed state and, subsequently automatically returned to its uncompressed/deployed state upon removal of the compressive load. Unlike the monostable bolster insert discussed above, a bistable bolster insert will persist in its collapsed state until a suitably directed external force is exerted on it to force its return to the original configuration. Bistable bolster inserts require a means to exert the re-deployment force. Examples of such means include pull tabs that are directly or indirectly coupled mechanically to the bolster insert, and inflatable bladders deployed under the bolster insert.

With collective reference to FIGS. 3A, 3B, 4A and 4B, the bolster insert 156 may be constructed with, or may consist essentially of, a hollow, pseudo-bistable polymeric body 157 that readily collapses under the weight of the folded seat back/bottom and elastically recovers back to its original shape upon removal of the seat back/bottom weight. Unlike some conventional seat bolster constructions, in which a rigid bolster insert is integrated into the seat assembly to prevent bolster sagging, disclosed concepts employ an elastically morphing bistable (pronounced bye-stay-bull) structure with engineered viscoelastic characteristics that enable passive collapsing and expansion of the seat bolster without hydraulic, pneumatic, or electronic impetus. By cooperatively engineering both the geometric parameters and the material characteristics of the hollow polymeric body 157, the bolster insert 156 structure may be passively actuated into a compressed state and, once actuated, may automatically return to its uncompressed state without further actuation. Self-actuated elastic recovery of the bolster insert 156 may necessitate the hollow polymeric body 157 have an open base that is rigidly anchored to an internal frame structure 56 and 58 of the seat back 24 or the seat bottom 26.

FIGS. 3A and 4A portray the bolster insert's hollow polymeric body 157 taking on an arcuate shape with a semi-elliptical cross-section when the seat assembly 20 is unfolded and the bolster insert 156 is in a deployed, steady state. Depending on the seat's intended application and corresponding design restrictions, the hollow polymeric body 157 may be a semi-ellipsoidal dome with an open, ellipse-shaped base, as shown hidden in FIG. 2. It is envisioned that the bolster insert body 157 may take on any of any assortment of different shapes and sizes, including a truncated semi-ellipsoidal dome, a semi-prolate spheroid dome, and other regular and irregular three-dimensional dome shapes. As best seen in FIGS. 3B and 4B, the bolster insert's hollow polymeric body 157 may take on a waveform cross-section with multiple peaks and a valley when the seat assembly 20 is folded and the bolster insert 156 is collapsed under the weight of the folded seat in a retracted, unsteady state. In this collapsed and retracted state, an elongated channel may be recessed into and extend the length of the top of the dome. When the seat back 24 is pivoted against the seat bottom 26 (e.g., folded counterclockwise in FIG. 2), the hollow polymeric body 157 collapses into the retracted state under the compressive force of seat back's weight. When the seat back 24 is pivoted away from the seat bottom 26 (e.g., rotated clockwise in FIG. 2), the bolster insert body 157 passively snaps back to the deployed state. When deployed, the hollow polymeric body 157 has a first center height $H_{C1}$; when retracted, the bolster insert body 157 has a second center height $H_{C2}$ that is less than the first center height $H_{C1}$. In at least some embodiments, the first center height $H_{C1}$ is at least 1.5 times to 2.0 time larger than the second center height $H_{C2}$.

Figure 5A:
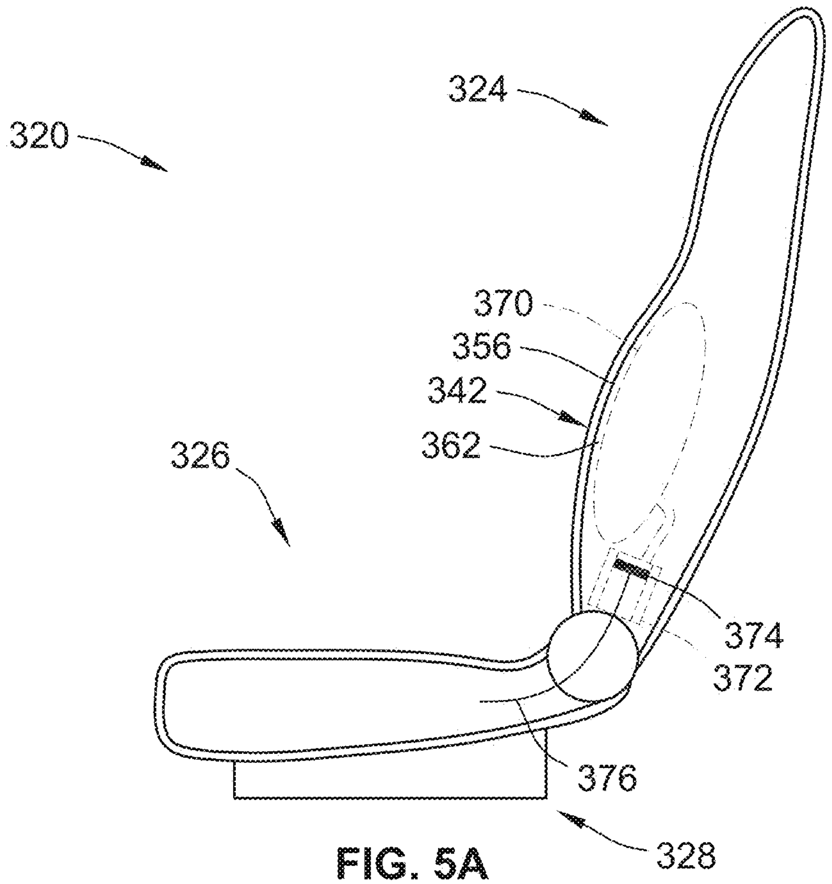
FIGS. 5A and 5B are sectional illustrations of yet another representative snap-through collapsible seat bolster design in accord with aspects of the present disclosure.
Figure 5B:
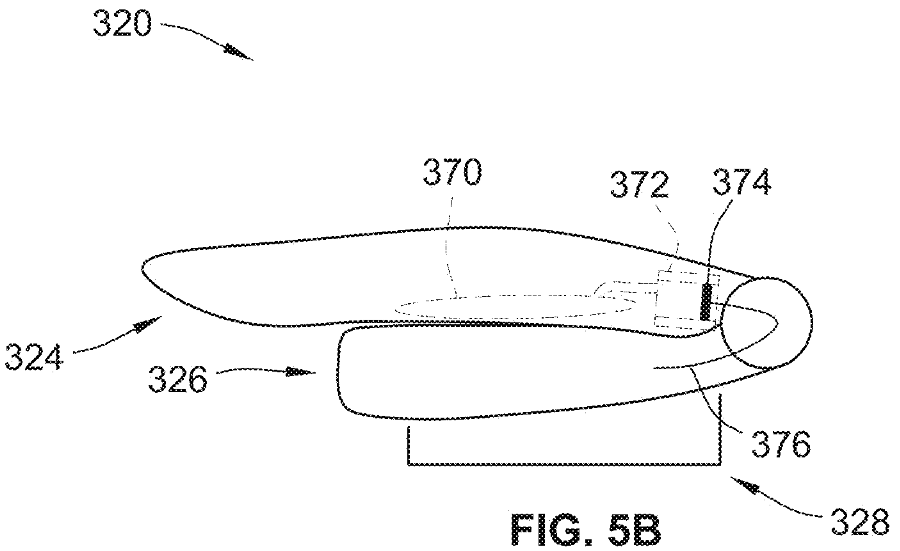

Turning next to FIGS. 5A and 5B, there is shown another representative seat assembly 320 for seating a user on a support surface. While differing in appearance, it is envisioned that the seat assembly 320 of FIGS. 5A and 5B may include any of the features and options described above with respect to the vehicle seat assembly 20 of FIGS. 1 and 2 and the collapsible seat bolsters 142, 242 of FIGS. 3A-4B, and vice versa. For instance, the seat assembly 320 includes a seat back subassembly 324 that is pivotably attached to a seat bottom subassembly 326, both of which receive subjacent support on a seat base subassembly 328. In this example, the seat back 324 includes a pair of collapsible seat bolsters 342 that are disposed on lateral sides of the seat back 324. These collapsible seat bolsters 342 may be functionally and structurally similar to the seat bolsters 142, 242 of FIGS. 3A-4B.

Each seat back side bolster 342 of FIGS. 5A and 5B includes a fluid bladder 370 that is disposed inside the internal bolster cavity 362 underneath the bolster insert 356 (e.g., and covered by a padded topper layer 158 and bolster trim 160). The fluid bladder 370 is packaged inside the seat back 324 and operatively attached to the seat bottom 326 such that: (1) folding the seat back 324 against the seat bottom 326 causes fluid to evacuate from the fluid bladder 370, e.g., causing the bladder 370 to pull the bolster insert 356 to a retracted state (FIG. 5B); and (2) rotating the seat back 324 away from the seat bottom 326 causes fluid to fill the fluid bladder 370, e.g., such that the bladder 370 expands and biases the bolster insert 356 to a deployed state (FIG. 5A). It should be appreciated that the shape and size of the fluid bladder 370 presented in the Figures are merely exemplary in nature; as such, the fluid bladder 370 may take on smaller or larger sized of similar to distinct shapes without departing from the intended scope of this disclosure.

Each side bolster 342 may also include a pneumatic cylinder 372 that is fluidly coupled to the fluid bladder 370, a piston 374 that is reciprocally slidable within the pneumatic cylinder 372, and a mechanical linkage 376 that physically connects the piston 374 to the seat bottom 326. With this arrangement, pivoting the seat back 324 against the seat bottom 326 causes the mechanical linkage 376 to pull the piston 374 to an evacuate position (FIG. 5B) to thereby evacuate fluid from the fluid bladder 370. Conversely, pivoting the seat back 324 away from the seat bottom 326 causes the mechanical linkage 376 to push the piston 374 to a fill position (FIG. 5A) to thereby fill the fluid bladder 370 with fluid. It is also envisioned that the seat assembly may use a pneumatic or hydraulic pump to facilitate fill and evacuation of the bladder.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A seat assembly for seating a user on a floor structure, the seat assembly comprising:
- a seat base configured to abut the floor structure;
- a seat bottom attached to the seat base and configured to seat thereon the user;
- a seat back pivotably attached to the seat base adjacent the seat bottom; and
- first and second side bolsters attached to first and second sides, respectively, of the seat bottom or the seat back, the first and second side bolsters each including:
  - a foam core defining a cavity;
  - a bolster trim covering the foam core;
  - a bolster insert located inside the bolster trim adjacent the foam core, the bolster insert including a hollow elastic body configured to collapse from a deployed state to a retracted state under a compressive force when the seat back is pivoted against the seat bottom, and to snap back from the retracted state to the deployed state upon pivoting of the seat back away from the seat bottom; and
  - a fluid bladder disposed inside the cavity such that pivoting the seat back against the seat bottom causes fluid to evacuate from the fluid bladder, and pivoting the seat back away from the seat bottom causes fluid to fill the fluid bladder such that the fluid bladder expands and biases the bolster insert to the deployed state.

2. The seat assembly of claim 1, wherein the bolster insert is interposed between the bolster trim and the foam core, and wherein the first and second side bolsters each further includes a padded topper layer interposed between the bolster trim and the bolster insert.

3. The seat assembly of claim 2, wherein the bolster trim abuts and lays flush against the padded topper layer, and the padded topper layer abuts and lays flush against the bolster insert.

4. The seat assembly of claim 1, wherein the cavity is interposed between the foam core and the bolster insert such that a center portion of the hollow elastic body collapses into the cavity when in the retracted state.

5. The seat assembly of claim 1, wherein the foam core abuts and lays flush against the bolster insert, and the cavity is defined within the foam core.

6. The seat assembly of claim 1, wherein the hollow elastic body has an arcuate shape with a semi-elliptical cross-section when in the deployed state and has a waveform cross-section with multiple peaks and a valley when in the retracted state.

7. The seat assembly of claim 1, wherein the hollow elastic body has a first center height when in the deployed state and a second center height when in the retracted state, the first center height being at least 1.5 times larger than the second center height.

8. The seat assembly of claim 1, wherein the hollow elastic body is an elastically morphing bistable structure formed from a compliant viscoelastic polymer.

9. The seat assembly of claim 1, wherein the hollow elastic body is a polymeric semi-ellipsoidal dome with an open elliptical base.

10. The seat assembly of claim 1, wherein the hollow elastic body has an open base rigidly anchored to an internal frame structure of the seat bottom or the seat back.

11. A seat assembly for seating a user on a floor structure, the seat assembly comprising:
- a seat base configured to abut the floor structure;
- a seat bottom attached to the seat base and configured to seat thereon the user;
- a seat back pivotably attached to the seat base adjacent the seat bottom; and
- first and second side bolsters attached to first and second sides, respectively, of the seat bottom or the seat back, the first and second side bolsters each including:
  - a foam core;
  - a bolster trim covering the foam core;
  - a bolster insert located inside the bolster trim adjacent the foam core, the bolster insert including a hollow elastic body configured to collapse from a deployed state to a retracted state under a compressive force exerted by the seat back when pivoted against the seat bottom, and to snap back from the retracted state to the deployed state upon removal of the compressive force by pivoting the seat back away from the seat bottom;
  - a fluid bladder located inside the bolster insert;
  - a pneumatic cylinder including a cylinder body fluidly coupled to the fluid bladder and a piston reciprocally slidable within the cylinder body; and
  - a mechanical linkage connecting the piston to the seat bottom and/or the seat back such that pivoting the seat back against the seat bottom causes the mechanical linkage to pull the piston and thereby evacuate fluid from the fluid bladder, and pivoting the seat back away from the seat bottom causes the mechanical linkage to push the piston and thereby fill the fluid bladder with the fluid.

12. The seat assembly of claim 1, wherein each of the first and second side bolsters further includes:
- a pneumatic cylinder fluidly coupled to the fluid bladder;
- a piston slidable within the pneumatic cylinder; and
- a mechanical linkage connecting the piston to the seat bottom and/or the seat back such that pivoting the seat back against the seat bottom causes the mechanical linkage to pull the piston to an evacuate position to thereby evacuate the fluid from the fluid bladder, and pivoting the seat back away from the seat bottom causes the mechanical linkage to push the piston to a fill position to thereby fill the fluid bladder with the fluid.

13. The seat assembly of claim 1, wherein the cavity is filled with an ultra-low density flexible foam filler.

14. A method of assembling a seat assembly for seating a user on a floor structure, the method comprising:

receiving a seat base configured to abut and/or mount to the floor structure;

attaching a seat bottom to the seat base, the seat bottom being configured to seat thereon the user;

attaching a seat back to the seat base adjacent the seat bottom, the seat back being configured to pivot between a folded position and an upright position; and attaching first and second side bolsters to first and second sides, respectively, of the seat bottom or the seat back, the first and second side bolsters each including:

a foam core defining a cavity;

a bolster trim covering the foam core;

a bolster insert located inside the bolster trim adjacent the foam core, the bolster insert including a hollow elastic body configured to collapse from a deployed state to a retracted state under a compressive force when the seat back is pivoted against the seat bottom, and to snap back from the retracted state to the deployed state upon pivoting of the seat back away from the seat bottom; and a fluid bladder disposed inside the cavity such that pivoting the seat back against the seat bottom causes fluid to evacuate from the fluid bladder, and pivoting the seat back away from the seat bottom causes fluid to fill the fluid bladder such that the fluid bladder expands and biases the bolster insert to the deployed state.

15. The method of claim 14, wherein the first and second side bolsters each further includes a padded topper layer interposed between the bolster trim and the bolster insert, wherein the bolster trim abuts and lays flush against the padded topper layer, and the padded topper layer abuts and lays flush against the bolster insert.

16. The method of claim 14, wherein the hollow elastic body is arcuate with a semi-elliptical cross-section when in the deployed state and has a waveform cross-section with multiple peaks and a valley when in the retracted state.

17. The method of claim 14, wherein the hollow elastic body has a first center height when in the deployed state and a second center height when in the retracted state, the first center height being at least 1.5 times larger than the second center height.

18. The method of claim 14, wherein the hollow elastic body is an elastically morphing bistable structure formed from a compliant viscoelastic polymer.

19. The method of claim 14, wherein the hollow elastic body has an open base rigidly anchored to an internal frame structure of the seat bottom or the seat back.

20. The seat assembly of claim 11, wherein the first and second side bolsters each further includes a fluid bladder disposed inside the cavity and operatively attached to the seat bottom and/or the seat back such that: pivoting the seat back against the seat bottom causes fluid to evacuate from the fluid bladder such that the fluid bladder pulls the bolster insert to the retracted state, and pivoting the seat back away from the seat bottom causes fluid to fill the fluid bladder such that the fluid bladder expands and biases the bolster insert to the deployed state.

* * * * *